United States Patent
Kajiura et al.

(10) Patent No.: US 7,008,725 B2
(45) Date of Patent: *Mar. 7, 2006

(54) HYDROGEN-STORING CARBONACEOUS MATERIAL AND METHOD FOR PRODUCING THE SAME, HYDROGEN-STORED CARBONACEOUS MATERIAL AND METHOD FOR PRODUCING THE SAME AND BATTERY AND FUEL CELL USING HYDROGEN-STORED CARBONACEOUS MATERIAL

(75) Inventors: Hisashi Kajiura, Kanagawa (JP); Masashi Shiraishi, Tokyo (JP); Eisuke Negishi, Tokyo (JP); Masafumi Ata, Kanagawa (JP)

(73) Assignee: Sony Corporation, Tokyo (JP)

( * ) Notice: Subject to any disclaimer, the term of this patent is extended or adjusted under 35 U.S.C. 154(b) by 370 days.

This patent is subject to a terminal disclaimer.

(21) Appl. No.: 10/221,811

(22) PCT Filed: Mar. 16, 2001

(86) PCT No.: PCT/JP01/02129

§ 371 (c)(1),
(2), (4) Date: Jan. 29, 2003

(87) PCT Pub. No.: WO01/68526

PCT Pub. Date: Sep. 20, 2001

(65) Prior Publication Data
US 2004/0058241 A1    Mar. 25, 2004

(30) Foreign Application Priority Data
Mar. 16, 2000 (JP) .............................. 2000-074415

(51) Int. Cl.
H01M 4/58 (2006.01)

(52) U.S. Cl. .................. 429/218.2; 429/20; 429/231.8; 423/445 R; 423/645; 423/447.2

(58) Field of Classification Search ............. 429/218.2, 429/20, 231.8; 423/445 R, 645, 447.2
See application file for complete search history.

(56) References Cited

U.S. PATENT DOCUMENTS

| 4,716,736 A | 1/1988 | Schwarz |
| 6,268,077 B1 * | 7/2001 | Kelley et al. .................. 429/33 |
| 2001/0016283 A1 * | 8/2001 | Shiraishi et al. ......... 429/218.2 |

FOREIGN PATENT DOCUMENTS

| EP | 0154 165 | 9/1985 |
| JP | 60-247073 | 12/1985 |
| JP | 62-216901 | 9/1987 |
| JP | 10-72291 | 3/1989 |
| JP | 5-270801 | 10/1993 |
| JP | 8-24636 | 1/1996 |
| JP | 10-72201 | 3/1998 |
| JP | 2000-103612 | * 4/2000 |
| JP | 2000-264602 | 9/2000 |
| WO | WO 97/26082 | 7/1997 |
| WO | WO 99/40023 | * 8/1999 |
| WO | WO 00/76625 | * 12/2000 |

OTHER PUBLICATIONS

X. B. Wu et al., "Hydrogen uptake by carbon nanotubes", International Journal of Hydrogen Energy (2000), vol. 25, pp. 261-265.

Yue-Ying Fan et al., "Hydrogen uptake in vapor-grown carbon nanofibers" Carbon (1999), vol. 37, pp. 1649-1652.

ECO Industry Publication, vol. 4, No. 7, pp. 12-18 (1999).

* cited by examiner

Primary Examiner—Laura Weiner
(74) Attorney, Agent, or Firm—Bell, Boyd & Lloyd LLC

(57) ABSTRACT

A hydrogen-storing carbonaceous material is provided. The present invention provides a hydrogen-storing carbonaceous material obtained by heating a carbonaceous material at more than about 50° C. under the atmosphere of reducing gas, a hydrogen-stored carbonaceous material obtained by hydrogen storage in the carbonaceous material heated at more than about 50° C. under the atmosphere of reducing gas, and a battery or a fuel cell using the hydrogen-stored carbonaceous material.

1 Claim, 4 Drawing Sheets

HYDROGEN-STORING CARBONACEOUS MATERIAL AND METHOD FOR PRODUCING THE SAME, HYDROGEN-STORED CARBONACEOUS MATERIAL AND METHOD FOR PRODUCING THE SAME AND BATTERY AND FUEL CELL USING HYDROGEN-STORED CARBONACEOUS MATERIAL

RELATED APPLICATION DATA

The present application claims priority to Japanese Patent Application No. P2000-074415 filed on Mar. 16, 2000, herein incorporated by reference to the extent permitted by law.

BACKGROUND OF THE INVENTION

The present invention relates to a hydrogen-storing carbonaceous material and a method for producing it, a hydrogen-stored carbonaceous material and a method for producing it and a battery and a fuel cell using a hydrogen-stored carbonaceous material, and more particularly to a hydrogen-storing carbonaceous material and a method for producing it, a hydrogen-stored carbonaceous material and a method for producing it and a battery using the carbonaceous-stored carbonaceous material and a fuel cell using the hydrogen-stored carbonaceous material.

Fossil fuel such as gasoline, light oil, or the like has and continues to be widely used as the energy source for producing an electric power as well as the energy source of motor vehicles or the like. The fossil fuel not only may possibly degrade a global environment, but also is resource limited and is questionable whether or not the fossil fuel can be stably supplied.

Hydrogen has been paid attention to in place of the fossil fuel having the above described problems. The hydrogen is contained in water, inexhaustibly exists on the earth and includes a large quantity of chemical energy per amount of material. Further, the hydrogen has advantages as a clean and inexhaustible energy source by which the fossil fuel is replaced, because the hydrogen does not discharge harmful substances or global greenhouse gas or the like when it is used as the energy source.

Especially recently, the fuel cell that an electric energy can be taken out from the hydrogen energy has been eagerly studied and developed and it has been expected that the fuel cell is applied to a large-scale power generation, an onsite private power generation, and further, to a power supply for a motor vehicle.

On the other hand, since the hydrogen is gaseous under ambient temperature and ambient pressure, it is treated with more difficulty than liquid or solid. Since the density of the gas is extremely small as compared with that of liquid or solid, the chemical energy of the gas is small per volume. Further, it is inconveniently difficult to store or transport the gas. Still further, since the hydrogen is gas, it is liable to leak. When the hydrogen leaks, the danger of explosion is undesirably generated, which results in a great trouble in utilization of the hydrogen energy.

Thus, in order to put an energy system using the hydrogen energy to practical use, the development of a technique that the gaseous hydrogen is efficiently and safely stored in a small volume has been promoted. There have been proposed a method for hydrogen storage as high pressure gas, a method for hydrogen storage as liquefied hydrogen and a method for using a hydrogen-storing material, or the like.

In the method for hydrogen storage as the high pressure gas, since a very strong metallic pressure proof vessel such as a cylinder needs to be used as a storage vessel, the vessel itself becomes extremely heavy and the density of the high pressure gas is ordinarily about 12 mg/cc. Accordingly, not only the storage density of the hydrogen is disadvantageously very small and a storage efficiency is low, but also there has a problem in view of safety because of high pressure.

On the contrary, in the method for hydrogen storage as the liquefied hydrogen, the storage density is ordinarily about 70 mg/cc. Although the storage density is considerably high, it is necessary to cool hydrogen down to lower than −250° C. in order to liquefy, so that an additional device such as a cooling device is required. Therefore, not only a system has been undesirably complicated, but also energy for cooling has been needed.

Further, hydrogen-stored alloys are most effective materials among the hydrogen-stored materials. For instance, there have been known lanthanum-nickel, vanadium, and magnesium hydrogen-stored alloys. The practical hydrogen storage density of these hydrogen-stored alloys is generally 100 mg/cc. Although the hydrogen is stored in these hydrogen-stored alloys, the hydrogen storage density of these alloys is not lower than that of liquefied hydrogen. Therefore, the use of the hydrogen-storing materials is the most efficient among conventional hydrogen storage methods. Further, when the hydrogen-storing alloy is used, the hydrogen can be stored in the hydrogen-storing alloy and the hydrogen can be discharged from the hydrogen-storing alloy at around room temperature. Further, since the hydrogen storage condition is controlled under the balance of the partial pressure of hydrogen, the hydrogen-storing alloy is advantageously treated more easily than the high pressure gas or the liquefied hydrogen.

However, since the hydrogen-stored alloys consist of metallic alloys, they are heavy and the amount of stored hydrogen is limited to approximately 20 mg/g per unit weight, which may not be said to be sufficient. Further, since the structure of the hydrogen-storing alloy is gradually destroyed in accordance with the repeated the cycle of storing and discharging of hydrogen gas, a performance is undesirably deteriorated. Still further, problems may arise with respect to resource and environmental needs depending on the composition of the alloy.

Thus, for overcoming the above described issues of the conventional methods for hydrogen storage, a carbon material is paid attention to as the hydrogen-storing material.

For example, Japanese Patent Application Laid-Open No. hei. 5-270801 proposes a method that the addition reaction of hydrogen is applied to fullerene to store hydrogen. In this method, since a chemical bond such as a covalent bond is formed between a carbon atom and a hydrogen atom, this method is to be called an addition of hydrogen rather than a hydrogen storage. Since the upper limit of the amount of hydrogen which can be added by the chemical bonds is essentially restricted to the number of unsaturated bonds of carbon atoms, the amount of stored hydrogen is limited.

Further, Japanese Patent Application Laid-Open No. hei. 10-72201 proposes a technique that fullerene is used as the hydrogen-storing material and the surface of the fullerene is covered with catalytic metal such as platinum deposited by a vacuum method or a sputtering method to store hydrogen. In order to employ platinum as the catalytic metal and cover the surface of fullerene with it, much platinum needs to be used so that not only a cost is increased, but also a problem is generated in view of resources.

Other problems exist from a practical standpoint when hydrogen energy is utilized. Especially, when the hydrogen energy is employed as an energy source for motor vehicles, marine vessels, general domestic power supplies, various kinds of small electric devices, the like or when a large amount of hydrogen needs to be conveyed, the conventional methods for hydrogen storage is not practical.

SUMMARY OF THE INVENTION

It is an advantage of the present invention to provide a hydrogen-storing carbonaceous material and a method for producing it, a hydrogen-stored carbonaceous material and a method for producing it and a battery and a fuel cell using a hydrogen-stored carbonaceous material which are lightweight, can be repeatedly used in a safe manner and minimal, if any, impact on resource and environmental concerns.

The inventors of the present invention have found that the carbonaceous material can be heated at more than about 50° C. under the atmosphere of reducing gas so that the hydrogen-storing capability of the carbonaceous material can be enhanced.

In order to store a large amount of hydrogen in the carbonaceous material, it is an important factor to increase an area where the surface of the carbonaceous material comes into contact with hydrogen atoms or hydrogen molecules when a storing is carried out in the form of a chemisorption or when the storing of hydrogen is carried out in the form of a proton storage. Therefore, it is important to clean the surface of the carbonaceous material and efficiently remove impurities on the surface. In that case, while it was possible to clean the surface of the carbonaceous material and remove the impurities of the surface by using inert gas such as nitrogen gas, argon gas, it was found according to the study of the inventors of the present invention that the carbonaceous material was heated so in the atmosphere of reducing gas that the surface of the carbonaceous material was efficiently cleaned and an area where the surface of the carbonaceous material comes into contact with the hydrogen atoms or the hydrogen molecules could be greatly increased.

The present invention in an embodiment relates to a manufacture for a hydrogen-storing carbonaceous material by heating the carbonaceous material at more than 50° C. under the atmosphere of reducing gas and a hydrogen-stored carbonaceous material that hydrogen is stored in the carbonaceous material heated at more than 50° C. under the atmosphere of reducing gas.

Further, the present invention in an embodiment relates to a manufacture for a hydrogen-stored carbonaceous material obtained after the carbonaceous material is heated at more than 50° C. under the atmosphere of reducing gas to store hydrogen.

Further, the present invention in an embodiment relates to a battery having an anode, a cathode, an electrolyte interposed therebetween, and the anode and/or the cathode includes a hydrogen-stored carbonaceous material obtained by heating the carbonaceous material at more than 50° C. under the atmosphere of reducing gas to store hydrogen.

When the present invention is applied to an embodiment to an alkaline storage battery in which aqueous alkaline solution such as potassium hydroxide solution is employed for the electrolyte, a proton moves to the anode from the cathode through the aqueous alkaline solution to store the proton in the anode during a charging process. The proton can be moved to the cathode side from the anode side through the aqueous alkaline solution during a discharging process. Further, when the present invention is applied in an embodiment to a hydrogen-air fuel cell in which perfluorosulfonic acid polymer electrolyte film or the like is used for the electrolyte, a proton previously stored in a hydrogen electrode by a charging or storing process is supplied to an air electrode through the polymer electrolyte film during the discharging process. Accordingly, in the hydrogen-air fuel cell, an electric power can be generated in a stable manner.

Further, the present invention in an embodiment contains a cell having an anode, a cathode, and a proton conductor therebetween, wherein the anode and/or the cathode has the hydrogen-storing carbonaceous material obtained by heating a carbonaceous material at more than 50° C.

Since a fuel cell according to the present invention in an embodiment has the laminated structure of the anode, the proton conductor and the cathode, and the hydrogen storage portion including the hydrogen-stored carbonaceous material obtained by heating the carbonaceous material under the atmosphere of gas including hydrogen gas and substantially including no reactive gas as impurity gas to store hydrogen, discharging hydrogen and supplying it to the anode, the hydrogen discharged from the hydrogen storage part produces a proton in accordance with a catalytic action in the anode. The produced proton moves to the cathode together with a proton produced by the proton conductor so that the protons combine with oxygen to produce water and generate an electromotive force. Thus, according to the present invention, there can be provided the fuel cell in which the hydrogen can be more efficiently supplied than a case in which the hydrogen storage part is not provided and the conductivity of the protons is high.

In an embodiment of the present invention, the hydrogen stored in the carbonaceous material includes hydrogen molecules, hydrogen atoms, a proton as the atomic nucleus of hydrogen the like and combinations thereof.

The carbonaceous material employed in the present invention in an embodiment is preferably heated at lower than about 1500° C. In an embodiment, the carbonaceous material is heated at from about 200° C. to about 1400° C.

The reducing gas used in the present invention is composed of gas including carbon monoxide gas, nitric oxide gas, nitrous oxide gas, ammonia gas, the like and a mixture thereof. The carbon monoxide gas is most preferable among these gases, since it exhibits the highest reducing power.

According to the study of the inventors of the present invention, it is recognized that the surface cleaning effect and the hydrogen storage effect of the carbonaceous material under the atmosphere of the reducing gas are enhanced as gas pressure becomes higher. Therefore, the carbonaceous material is preferably heated under the gas pressure not lower than about 1 atmospheric pressure. Further, in the present invention, in an embodiment the carbonaceous material is heated under the atmosphere of the mixed gas of reducing gas and hydrogen gas.

As the carbonaceous material employed for the present invention, a carbonaceous material having a large surface and a structural curvature is employed. According to the study of the inventors of the present invention, since the carbonaceous material belongs to a s-p non-orthogonal electron system, it is found that HOMO and LUMO are lower than those of a s-p orthogonal electron system. Therefore, the carbonaceous material with the curvature can become a strong electron acceptor and separate the hydrogen into an electron and a proton (atomic nucleus of hydrogen) to store the hydrogen with high density in the form of the proton having no volume.

Further, the carbonaceous material in the present invention in an embodiment is composed of a carbonaceous material including fullerene, carbon nanofiber, carbon nanotube, carbon soot, nanocapsule, bucky onion, carbon fiber, the like and combinations thereof. With respect to fullerene in an embodiment, any spheroidal carbon molecules may be used and all spheroidal carbon molecules having the number of carbons such as 36, 60, 70, 72, 74, 76, 78, 80, 82, 84, the like and combinations thereof can be utilized.

Still further, the carbonaceous material used in the present invention in an embodiment includes on its surface fine particles made of metal or a metallic alloy having a function for separating hydrogen atoms from hydrogen molecules, or further, separating protons and electrons from the hydrogen atoms. The average size of the fine particles made of the metal or the alloy is desirably about 1 micron or smaller. In an embodiment, the metal or an alloy includes iron, rare earth elements, nickel, cobalt, palladium, rhodium, platinum or alloys composed of one or two or more of these metals or the like.

When the carbonaceous material in an embodiment having the curvature of fullerene, carbon nanofiber, carbon nanotube, carbon soot, nanocapsule, bucky onion and carbon fiber or the like is produced by an arc discharge method, the metal or the alloy thereof is preferably mixed into a graphite rod before the arc discharge. At the time of the arc discharge, the above described metals or the alloys thereof are allowed to exist, the yield of the carbonaceous material can be enhanced and the hydrogen-storing carbonaceous material with the curvature can from with the catalytic action of these metals or the alloy thereof. It has been known that these metals or the alloys thereof perform a catalytic action when the carbonaceous material such as fullerene, carbon nanofiber, carbon nanotube and carbon fiber or the like is produced by a laser ablation method. The carbonaceous material is an embodiment such as fullerene, carbon nanofiber, carbon nanotube and carbon fiber or the like may be collected, added to and mixed with the hydrogen-storing carbonaceous material so that the surface of the hydrogen-storing carbonaceous material includes these metals or the alloys thereof.

In the present invention, in an embodiment the carbonaceous material includes these metals or alloys thereof or the carbonaceous material including no metal or no alloy carries at least on its surface metallic fine particles of about 10 wt % or less which have a catalyzing function for separating hydrogen atoms from hydrogen molecules, and further, separating protons and electrons from the hydrogen atoms. As a preferable metal having such a catalyzing function, in an embodiment platinum or a platinum alloy, can be employed. In order to deposit these metals on the surface of the carbonaceous material, a sputtering method, a vacuum deposition method, a chemical method, a mixture or the like may be used.

Further, when platinum fine particles or platinum alloy fine particles are deposited on the carbonaceous material, a method using solution containing platinum complexes or an arc discharge method using electrodes including platinum may be applied thereto. In an embodiment, chloroplatinic acid solution is treated with sodium hydrogen sulfite or hydrogen peroxide, then, the carbonaceous material is added to the resultant solution and the solution is agitated so that the platinum fine particles or the platinum alloy fine particles can be carried on the carbonaceous materials. On the other hand, in the arc discharge method, in an embodiment the platinum or the platinum alloy is partly attached to the electrode part of the arc discharge, and is subjected to the arc discharge to be evaporated so that the platinum or the platinum alloy can be adhered to the carbonaceous material housed in a chamber.

The above described metals or the alloys thereof are deposited on the carbonaceous material, so that the hydrogen storage capacity can be more improved than that when the metals or the alloys thereof are not carried on the carbonaceous material. Further, it is found that fluorine and/or molecules thereof serving as an electron donor or an amine molecule such as ammonia is mixed or combined in an embodiment with the carbonaceous material to efficiently generate a charge separation.

As described above, hydrogen composed of protons and electrons is supplied to the hydrogen-storing carbonaceous material as a strong electron acceptor on which the above mentioned metals or the alloys are mounted, hence the hydrogen is stored in the form of protons. Therefore, its occupied volume is greatly reduced and a large amount of hydrogen can be stored in the hydrogen-storing carbonaceous material as compared with the storage by the conventional chemisorption of hydrogen atoms. That is, the hydrogen is separated into electrons and protons from the state of atoms, and the electrons are efficiently stored in the hydrogen-storing carbonaceous material so that a large amount of high density hydrogen can be finally stored in the state of protons. Accordingly, when the above described metals or the alloys are carried on the surface of the hydrogen-storing carbonaceous material, the hydrogen can be more efficiently stored and a larger amount of hydrogen can be stored. The above described hydrogen-storing carbonaceous material is light-weight, easily transported, can be repeatedly employed at around room temperature without generating a structural destruction and can be safely handled. Further, the amount of use of a metallic catalyst such as platinum can be reduced. The carbonaceous material such as fullerene serving as a starting material can be also produced at a low cost. Further, it is not problematic with respect to the procurement of resources nor with respect to environmental impacts during a use.

Additional features and advantages of the present invention are described in, and will be apparent from, the following Detailed Description of the Invention and the figures.

DETAILED DESCRIPTION OF THE INVENTION

Figure 1:
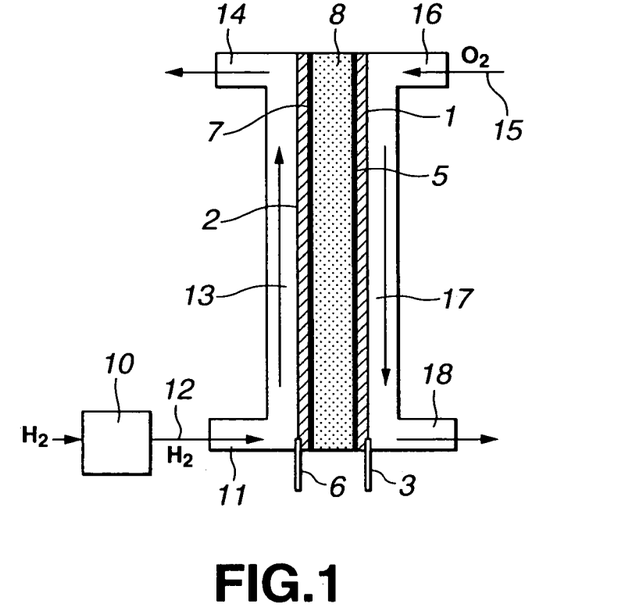
FIG. 1 is a diagram showing a schematic structure of a fuel cell according to an embodiment of the present invention.

The fuel cell according to an embodiment the present invention is provided with a cathode 1 and an anode 2 arranged so as to be opposed to each other as shown in FIG. 1. Here, as the cathode 1, an oxygen electrode is used. As the anode 2, a fuel electrode or a hydrogen electrode is used. The cathode 1 has a cathode lead 3 and a catalyst 5 is dispersed in the cathode or is adhered to the cathode. The anode 2 also has an anode lead 6 and a catalyst 7 is dispersed in the anode or is adhered to the anode. A proton conductor 8 is sandwiched in between the cathode 1 and the anode 2. Hydrogen 12 as fuel is supplied to a passage 13 in the side of the anode 2 through an introducing port 11 from a hydrogen supply source 10, and discharged from a discharge port 14. In the side of the cathode 1, air 15 is supplied to a passage 17 from an introducing port 16 and discharged from a discharge port 18.

While the hydrogen 12 serving as the fuel supplied to the passage 13 from the introducing port 11 passes the passage 13, protons are generated and the generated protons move to the side of the cathode 1 together with protons generated in the proton conductor 8. As a result, the protons react with oxygen in the air 15 supplied to the passage 17 from the introducing port 16 and directed to the discharge port 18 so that a desired electromotive force is taken out.

In the present invention, in an embodiment for the hydrogen supply source 10, is employed a hydrogen-stored carbonaceous material obtained by heating a carbonaceous material such as fullerene, carbon nanofiber, carbon nanotube, carbon soot, nanocapsule, bucky onion, carbon fiber, the like or combinations thereof at more than 50° C. and lower than 1500° C. under the atmosphere of carbon monoxide gas and then storing hydrogen.

In the fuel cell according to an embodiment of the present invention, since, while the protons are dissociated, the protons supplied from the anode 2 side move to the cathode 1 side in the proton conductor 8, the conductivity of the protons is characteristically improved. Therefore, since a humidifier which has been typically required for conducting protons is not needed, a system can be simplified and lightened.

Without limitation, examples and comparative examples illustrating the effectiveness of the present invention are described below.

EXAMPLE 1

A carbon nanofiber with one nanotube fiber whose diameter is about 200 mm was manufactured by a CVD method and impurities such as a catalyst were effectively removed until purity became 95% or higher before a thermobalance measurement was carried out.

The carbon nanofiber of 15.4 mg thus obtained was accommodated in a sample cup in a thermobalance, and then, initially, the contents in a measurement vessel were effectively replaced by using carbon monoxide gas.

Then, while the carbon monoxide gas of 1 atmospheric pressure was introduced into the measurement vessel at a flow velocity of 100 cc per minute, the carbon nanofiber was heated up to 400° C. at a rate of 60° C. per minute and maintained at 400° C. for 3 hours to clean the carbon nanofiber by the carbon monoxide gas.

After the cleaning process by the carbon monoxide gas, the carbon nanofiber was cooled to 20° C. After it was recognized that the temperature of the carbon nanofiber reached 20° C., hydrogen gas was introduced to the measurement vessel to measure the change of the mass of the carbon nanofiber.

Figure 2:
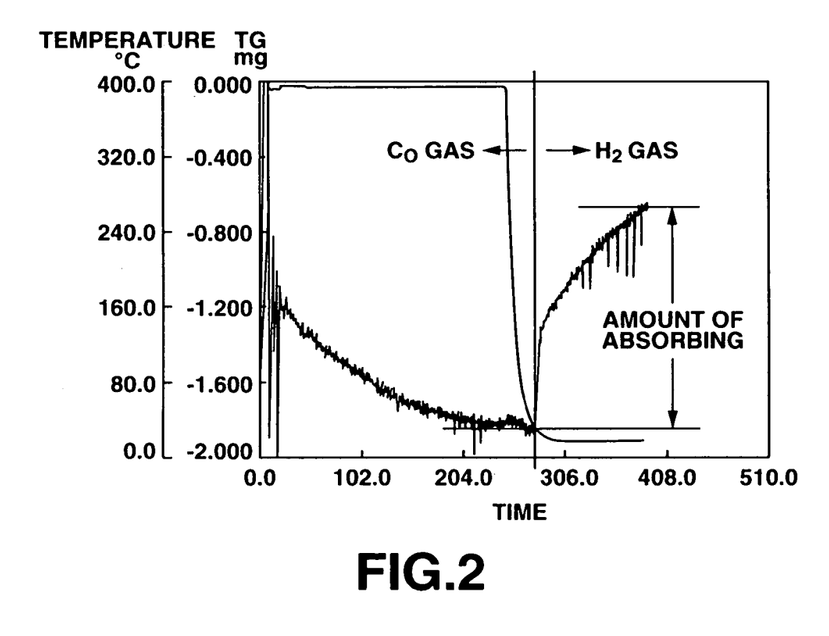
FIG. 2 is a graph showing results obtained by measuring the change of temperature and the mass of the carbon nanofiber according to an embodiment of the present invention.

FIG. 2 is a graph showing results obtained by measuring the change of temperature and the mass of the carbon nanofiber.

As shown in FIG. 2, while the cleaning operation by the carbon monoxide gas was carried out, the mass of the carbon nanofiber was gradually decreased. It is recognized that this phenomenon is produced, because the carbon monoxide gas is introduced into the measurement vessel so that impurities such as hydrogen, oxygen, functional groups, or the like on the surface of the carbon nanofiber are removed. Further, the rate of decrease of the mass of the carbon nanofiber is reduced at about 210 minutes after the carbon monoxide gas is introduced into the measurement vessel. It may be estimated that this phenomenon shows that the removal of impurities by the carbon monoxide gas is approaching completion.

On the other hand, when hydrogen gas was introduced into the measurement vessel, the mass of the carbon nanofiber was gradually increased. It may be estimated that this phenomenon shows that hydrogen is stored in the carbon nanofiber.

Thus, when the amount of hydrogen stored in the carbon nanofiber was obtained, it was recognized that hydrogen of 7.9 wt % was stored in the carbon nanofiber. Here, the amount of stored hydrogen is a value obtained by dividing the mass of stored hydrogen by the mass of carbon.

EXAMPLE 2

After a carbon nanofiber was cleaned by carbon monoxide gas in the absolutely same manner as that of the Example 1 except that while the carbon monoxide gas of 1 atmospheric pressure was introduced into the measurement vessel at a flow velocity of 100 cc per minute, the carbon nanofiber was heated up to 200° C. at a rate of 60° C. per minute and held at 200° C. for 3 hours to clean the carbon nanofiber by the carbon monoxide gas, the carbon nanofiber was cooled to 20° C. After it was recognized that the temperature of the carbon nanofiber reached 20 C., hydrogen gas was introduced to the measurement vessel to measure the change of the mass of the carbon nanofiber.

In such a manner, when the amount of stored hydrogen in the carbon nanofiber was obtained, it was found that hydrogen of 2.4 wt % was stored in the carbon nanofiber.

EXAMPLE 3

After a carbon nanofiber was cleaned by carbon monoxide gas in the effectively the same manner as that of the Example 1 except that while the carbon monoxide gas of 1 atmospheric pressure was introduced into the measurement vessel at a flow velocity of 100 cc per minute, the carbon nanofiber was heated up to 800° C. at a rate of 60° C. per minute and held at 800° C. for 3 hours to clean the carbon nanofiber by the carbon monoxide gas, the carbon nanofiber was cooled to 20° C. After it was recognized that the temperature of the carbon nanofiber reached 20° C., hydrogen gas was introduced to the measurement vessel to measure the change of the mass of the carbon nanofiber.

In such a manner, when the amount of stored hydrogen in the carbon nanofiber was obtained, it was found that hydrogen of 3.5 wt % was stored in the carbon nanofiber.

EXAMPLE 4

After a carbon nanofiber was cleaned by carbon monoxide gas in the effectively the same manner as that of the Example 1 except that while the carbon monoxide gas of 1 atmospheric pressure was introduced into the measurement vessel at a flow velocity of 100 cc per minute, the carbon nanofiber was heated up to 1400° C. at a rate of 60° C. per minute and held at 1400° C. for 3 hours to clean the carbon nanofiber by the carbon monoxide gas, the carbon nanofiber was cooled to 20° C. After it was recognized that the temperature of the carbon nanofiber reached 20° C., hydrogen gas was introduced to the measurement vessel to measure the change of the mass of the carbon nanofiber.

In such a manner, when the amount of stored hydrogen in the carbon nanofiber was obtained, it was found that hydrogen of 1.2 wt % was stored in the carbon nanofiber.

COMPARATIVE EXAMPLE 1

A carbon nanofiber was manufactured in the same manner as that of the Example 1 and impurities such as a catalyst were completely removed until purity became 95% or higher before a thermobalance measurement was carried out.

The carbon nanofiber of 15.4 mg thus obtained was accommodated in a sample cup in a thermobalance, and then, initially, the contents in a measurement vessel were completely replaced by using nitrogen gas.

Then, hydrogen gas of 1 atmospheric pressure was introduced into the measurement vessel at a flow velocity of 100 cc per minute and held for 3 hours.

Subsequently, nitrogen gas was introduced again into the measurement vessel to measure the change of the mass of the carbon nanofiber.

As a result, the change of the mass was not recognized. Thus, it was found that hydrogen was not stored.

COMPARATIVE EXAMPLE 2

After a carbon nanofiber was cleaned by carbon monoxide gas in effectively the same manner as that of the Example 1 except that while the carbon monoxide gas of 1 atmospheric pressure was introduced into the measurement vessel at a flow velocity of 100 cc per minute, the carbon nanofiber was heated up to 40° C. at a rate of 60° C. per minute and held at 40° C. for 3 hours to clean the carbon nanofiber by the carbon monoxide gas, the carbon nanofiber was cooled to 20° C. After it was recognized that the temperature of the carbon nanofiber reached 20° C., hydrogen gas was introduced to the measurement vessel to measure the change of the mass of the carbon nanofiber.

In such a manner, when the amount of stored hydrogen in the carbon nanofiber was obtained, the hydrogen storage was not recognized.

It was recognized from the Examples 1 to 4 and the Comparative Examples 1 and 2 that while the carbon nanofiber subjected to no processing and the carbon nanofiber cleaned by the carbon monoxide gas of 1 atmospheric pressure under the temperature of 40° C. have no hydrogen storage capacity, the hydrogen storage capacity of the carbon nanofiber cleaned by the carbon monoxide gas of 1 atmospheric pressure under from 200° C. to 1400° C. was greatly enhanced.

EXAMPLE 5

An alkaline storage battery was manufactured in the following manner.

Manufacture of Cathode

Carboxymethyl cellulose of 3 wt % was added to spherical nickel hydroxide of 10 g with the average particle size of 30 mm and cobalt hydroxide of 1 g and the mixture was kneaded with water to prepare paste. A porous nickel foam with the porosity of 95% was filled with the paste, and the porous nickel foam filled with the paste was dried and pressed, and then punched to manufacture a cathode having the diameter of 20 mm and the thickness of 0.7 mm.

Manufacture of Anode

Carboxymethyl cellulose of 5% and water were added to the hydrogen-stored carbonaceous material which prepared in accordance with the Example 1 to prepare kneaded paste. The porous nickel foam with the porosity of 95% was filled with the paste, the porous nickel foam filled with the paste was dried and pressed, and then punched to manufacture an anode with the diameter of 20 mm and the thickness of 0.5 mm.

Alkaline Storage Battery

Figure 3:
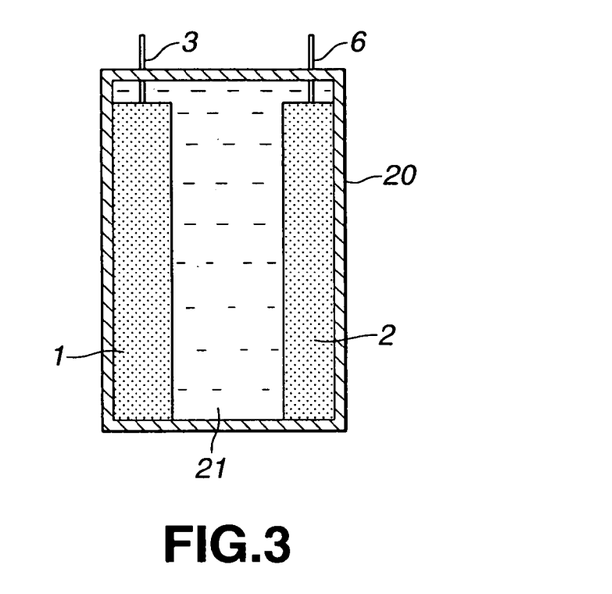
FIG. 3 is a diagram showing a schematic structure of an alkaline storage battery (secondary battery) according to an embodiment of the present invention.

Then, an alkaline storage battery (secondary battery) schematically shown in FIG. 3 was manufactured by using the cathode and the anode manufactured as described above and potassium hydroxide solution of 7N as electrolyte solution.

The alkaline storage battery includes a cathode 1, an anode 2 and electrolyte solution 21 contained therebetween in a battery vessel 20. A cathode lead 3 and an anode lead 6 are taken outside the battery vessel 20 from the respective electrodes.

Charge and Discharge Performance

For the alkaline storage battery manufactured as described above, the charge and discharge test was carried out with 0.1 C, the upper limit of 1.4V and the lower limit of 0.8 V. The cyclic characteristics at that time are shown in FIG. 4.

Figure 4:
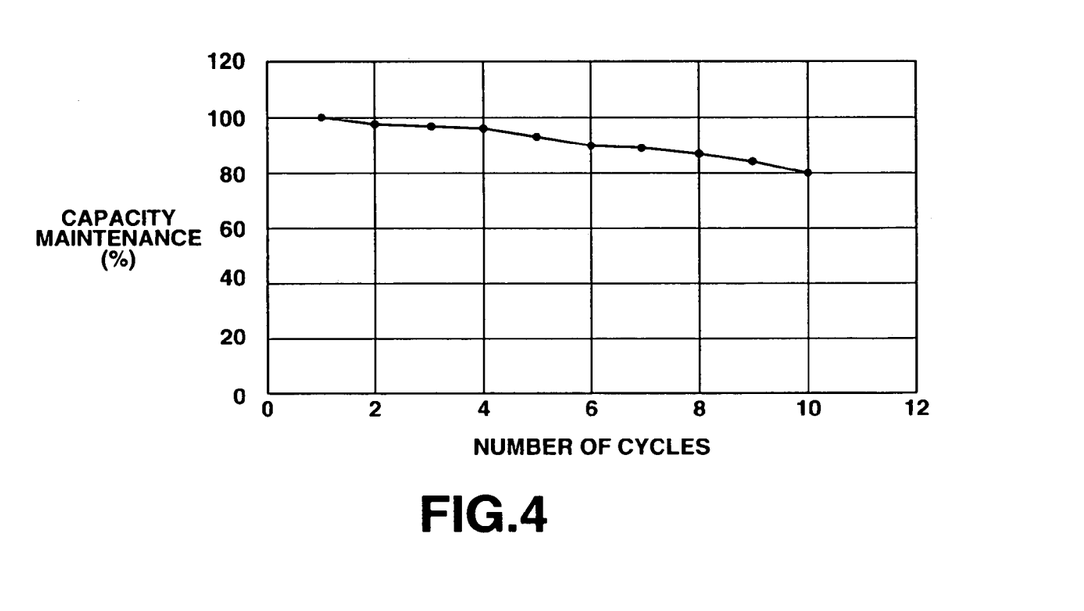
FIG. 4 is a graph showing the cyclic characteristics of the alkaline storage battery according to an embodiment of the present invention.

As apparent from FIG. 4, although it could not be said that a cycle life was not sufficient from the viewpoint of structure of the battery, a basic charge and discharge performance could be recognized.

EXAMPLE 6

A hydrogen-air fuel cell was manufactured in the following manner.

Manufacture of Air Electrode

The hydrogen-stored carbonaceous material was prepared in accordance with the Example 1. The hydrogen-stored carbonaceous material and polymer electrolyte alcoholic solution composed of perfluorosulfonic acid were dispersed in n-butyl acetate to prepare catalyst layer slurry.

On the other hand, a carbon nonwoven fabric with the thickness of 250 mm was immersed in the emulsion of fluorine water repellent, dried and then heated at 400° C., so that the carbon nonwoven fabric was subjected to a water repellent process. Subsequently, the carbon nonwoven fabric was cut to the size of 4 cm×4 cm and the catalyst layer slurry prepared as described above was applied to one surface thereof.

Adhesion of Air Electrode to Polymer Electrolyte Film

A polymer electrolyte film composed of perfluorosulfonic acid with the thickness of 50 mm was adhered to the surface of the carbon nonwoven fabric to which the catalyst layer was applied, and then, the film adhered to the nonwoven fabric was dried.

Manufacture of Hydrogen Electrode

Carboxymethyl cellulose of 5% and water were added to the same hydrogen-stored carbonaceous material as that used for manufacturing the air electrode to prepare paste. A porous nickel foam with the porosity of 95% was filled with the paste, dried and pressed and the dried and pressed porous nickel foam was cut to the size of 4 cm×4 cm to manufacture a hydrogen electrode with the thickness of 0.5 mm.

Manufacture of Hydrogen-Air Fuel Cell

The hydrogen electrode was superposed on the adhered body of the air electrode and the perfluorosulfonic acid polymer electrolyte film obtained as described above by holding the polymer electrolyte film therebetween. Both the surfaces thereof were firmly held by Teflon plates with the thickness of 3 mm and fixed by bolts. Many holes with diameter of 1.5 mm are previously opened on the Teflon plate arranged in the air electrode side so that air can be smoothly supplied to an electrode.

Figure 5:
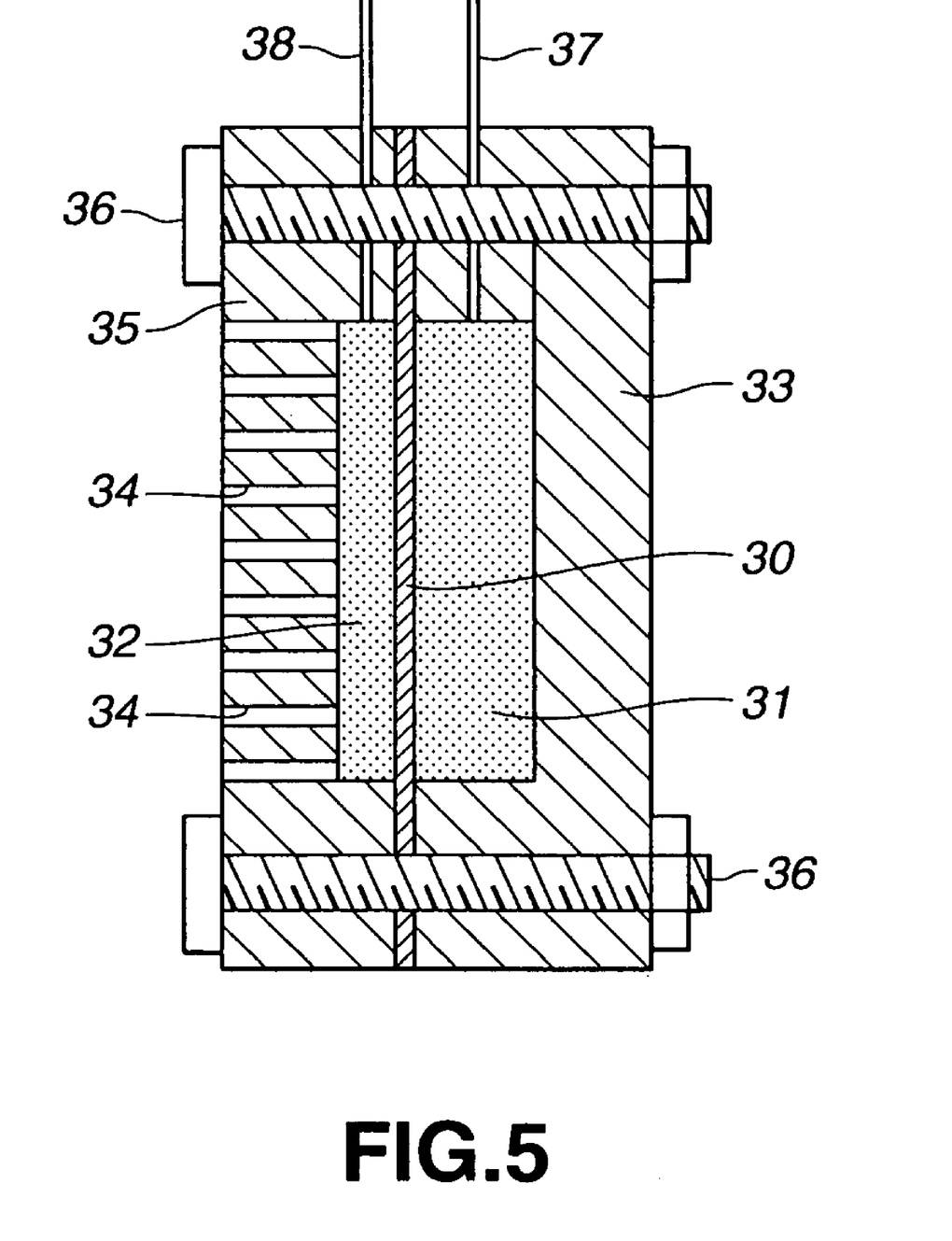
FIG. 5 is a diagram showing a schematic structure of a hydrogen-air fuel cell according to an embodiment of the present invention.

The schematic structure of the hydrogen-air fuel cell thus assembled is shown in FIG. 5.

As shown in FIG. 5, in the hydrogen-air fuel cell thus manufactured, a hydrogen electrode 31 and an air electrode 32 are arranged so as to be opposed to each other by locating a polymer electrolyte film 30 between the hydrogen electrode and the air electrode. The outer side of these members is held by a Teflon plate 33 and a Teflon plate 35 provided with many air holes 34 and all the body is fixed by means of bolts 36 and 36. A hydrogen electrode lead 37 and an air electrode lead 38 are respectively taken out from the respective electrodes.

Discharge Characteristics of Hydrogen-Air Fuel Cell

Then, the discharge characteristics of the hydrogen-air fuel cell was examined.

Figure 6:
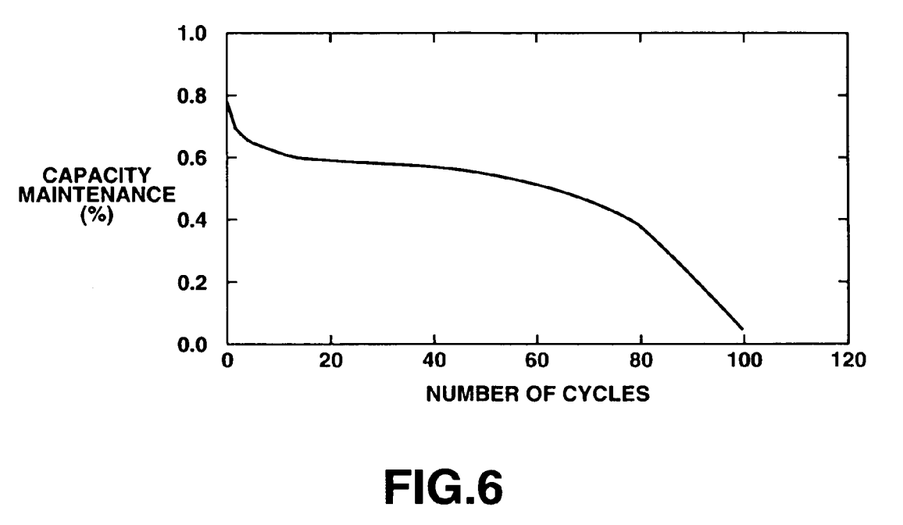
FIG. 6 is a graph showing the discharge characteristics of the hydrogen-air fuel cell according to an embodiment of the present invention.

Initially, electric current was supplied in a charging direction with the current density of 1 mA/cm$^2$ to store hydrogen in the hydrogen electrode. Then, a discharging operation was carried out with the current density of 1 mA/cm$^2$. As a result, the discharge characteristics as shown in FIG. 6 could be obtained and a function as the hydrogen-air fuel cell was recognized.

Figure 7:
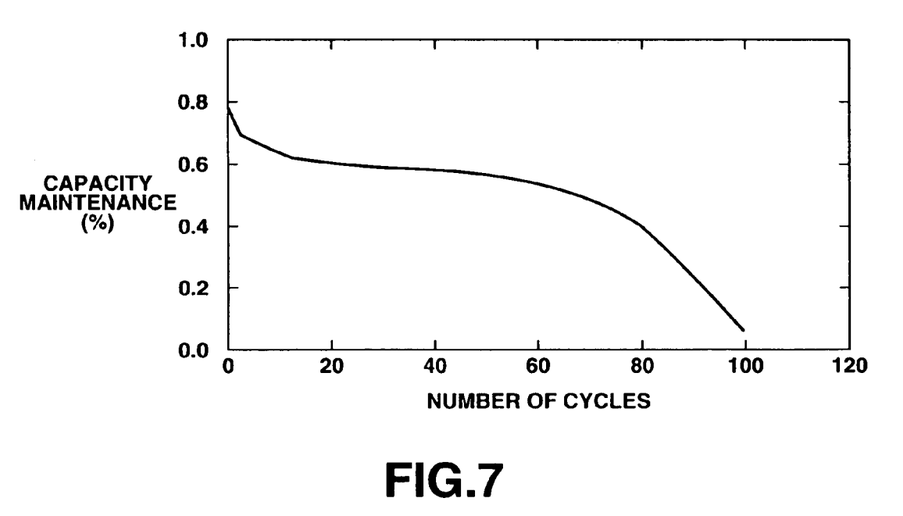
FIG. 7 is a graph showing the discharge characteristics of an another hydrogen-air fuel cell according to an embodiment the present invention.

Further, before the fuel cell was assembled, hydrogen was previously stored in the hydrogen electrode under the pressure of 100 kg/cm$^2$. The hydrogen electrode thus stored with hydrogen was superposed on the adhered body of the air electrode and the perfluorosulfonic acid polymer electrolyte film obtained as described above to assemble the hydrogen-air fuel cell. When the discharge characteristic of the obtained fuel cell was measured with the current density of 1 mA/cm$^2$, the discharge characteristic as shown in FIG. 7 was obtained and a function as the hydrogen-air fuel cell could be also recognized in this case.

It is to be understood that the present invention is not limited to the above described embodiments and Examples and can include a variety of suitable modifications thereof. For example, in the above described embodiments, although the fuel cell using the hydrogen-storing carbonaceous material and the hydrogen-stored carbonaceous material was described, the hydrogen-storing carbonaceous material and the hydrogen-stored carbonaceous material according to the present invention are not limited to the fuel cell but also may be widely applied to uses for hydrogen storage as well as other batteries such as an alkaline storage battery, a hydrogen-air fuel cell, or the like.

According to the present invention, there can be provided a hydrogen-storing carbonaceous material which can efficiently store a large amount of hydrogen, is light-weight and safe, can be repeatedly used and may not possibly generate problems in view of resources and an environment and a method for producing it, a hydrogen-stored carbonaceous material and a method for producing it, a battery using a hydrogen-stored carbonaceous material and a fuel cell using a hydrogen-stored carbonaceous material.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A method of producing a hydrogen-storing carbonaceous material, the method comprising annealing a carbon nanofiber material at a temperature ranging from about 200° C. to about 1400° C. and at a pressure of about 1 atmospheric pressure under an atmosphere of a carbon monoxide gas, wherein the carbon nanofiber material is produced by chemical vapor deposition.

* * * * *